United States Patent [19]

Vercillo et al.

[11] Patent Number: 4,495,456
[45] Date of Patent: Jan. 22, 1985

[54] AUTOMATIC REVERSING SYSTEM FOR SHREDDER

[75] Inventors: Alfredo J. Vercillo, Harwood Heights; Arthur Kuehn, Glenview, both of Ill.

[73] Assignee: General Binding Corporation, Northbrook, Ill.

[21] Appl. No.: 422,282

[22] Filed: Sep. 23, 1982

[51] Int. Cl.³ .............................................. H02P 3/20
[52] U.S. Cl. .................... 318/755; 318/753
[58] Field of Search .................. 241/36; 318/744, 753, 318/755, 283

[56] References Cited

U.S. PATENT DOCUMENTS

| | | | |
|---|---|---|---|
| 2,863,109 | 12/1958 | Meyer | 318/753 |
| 2,894,189 | 7/1959 | Enright | 318/755 |
| 3,087,162 | 4/1963 | Brown | 318/755 |
| 3,720,844 | 3/1973 | Sahs | 318/755 |

Primary Examiner—David Smith, Jr.
Attorney, Agent, or Firm—Hill, Van Santen, Steadman & Simpson

[57] ABSTRACT

An automatic reverse system for a shredder machine automatically causes reversal of the shredder motor when the system becomes jammed. A centrifugal switch connected with a starter winding of the drive motor disconnects power feed thereto when the motor is rotating above a predetermined speed. A manually actuated switching circuit in combination with the centrifugal switch initially energizes the system for forward operation. When a jam occurs, the centrifugal switch together with the switching circuit automatically causes a reversal in the direction of rotation of the motor, the reverse operation continuing until the operator manually actuates a switch to deenergize the system or when an automatic switch halts reverse rotation after a predetermined time period.

10 Claims, 1 Drawing Figure

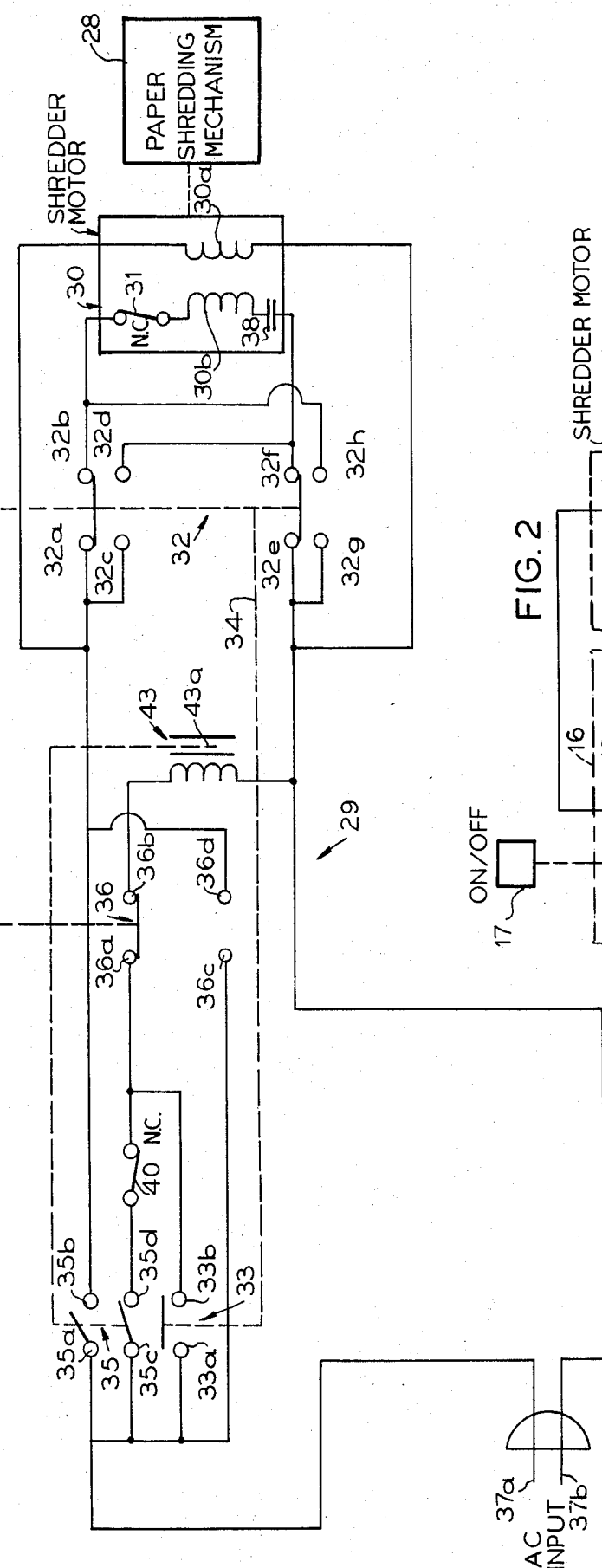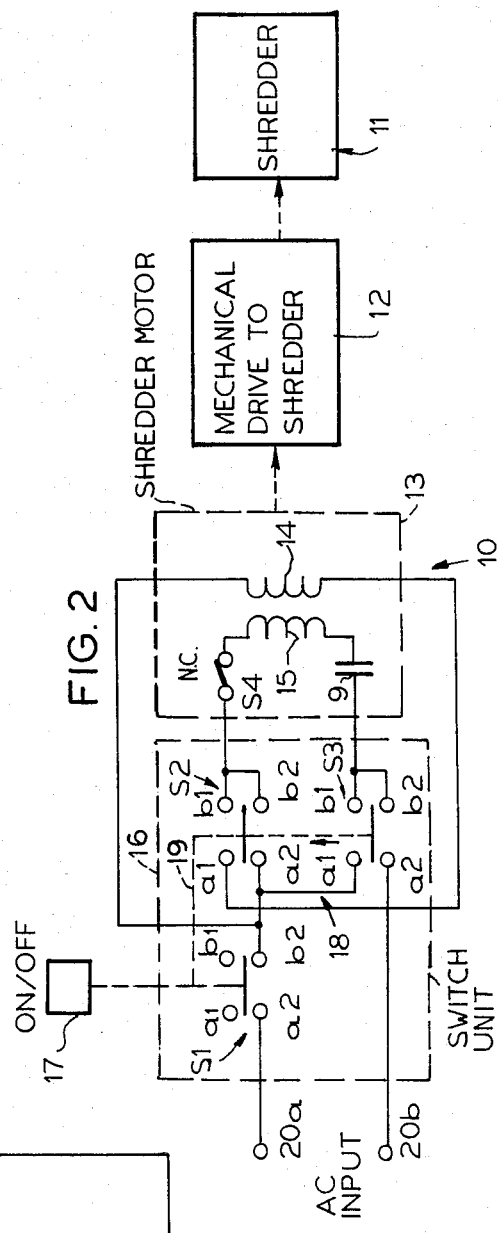

AUTOMATIC REVERSING SYSTEM FOR SHREDDER

BACKGROUND OF THE INVENTION

During the use of a paper shredder or similar types of machines, it is quite common to experience a jam. In this situation, to remove the material causing the jam, it is necessary to stop and reverse the shredder motor. In prior art systems, the operator intercedes when the jam occurs and shuts power to the machine off. The operator may then manually actuate the machine for reverse operation. Alternatively, it has been known to provide a current overload detector such as circuit breakers of various types which are automatically triggered when an overload occurs in the motor. The operator then resets the breaker and reverses the machine.

With the prior art systems, manual operator intervention is required. Additionally, sophisticated current sensing systems can be quite costly. Furthermore, circuit breakers which may rely on heating of a bi-metal element or the like, may have a delay associated therewith. During such a delay, the machine could be damaged.

SUMMARY OF THE INVENTION

It is an object of the invention to provide a low cost system for reversing operation of a shredder motor or the like when the machine incorporating the motor becomes jammed.

It is a further object of the invention to provide reverse operation automatically without operator intervention.

It is another object of the invention to provide a motor reversing system which is fast acting upon jamming of the machine.

According to the invention, an automatic reverse shredder system is provided employing an alternating current drive motor with a run winding, a start winding assembly, and a centrifugal switch. The centrifugal switch disconnects power feed to the starter winding when the motor is rotating above the predetermined speed. A manually actuatable switch circuit connects an AC power source to the motor windings. The switch circuit together with the centrifugal switch turns on the shredder motor for normal forward operation when manually actuated and automatically reverses the motor when jamming of the shredder occurs and the motor falls below a predetermined speed. The reverse operation of the motor automatically stops when the motor has operated in the reverse mode for a predetermined time or for a predetermined partial revolution.

BRIEF DESCRIPTION OF THE DRAWINGS

FIG. 1 is a schematic diagram of a preferred embodiment of the automatic reversing system of the invention; and FIG. 2 is a schematic diagram illustrating an alternate embodiment of the invention.

DESCRIPTION OF THE PREFERRED EMBODIMENTS

The automatic motor reversing system for shredding machines or the like is generally illustrated at 29 in FIG. 1. A paper shredding mechanism 28 is driven by the shredder motor 30. The shredder motor 30 has a run winding 30a, a start winding 30b, a phase changing capacitor 38, and a centrifugal normally closed switch 31. When the motor rotates above a certain speed, the centrifugal switch opens.

A momentary contact start motor switch 32 with an associated start button 38 is provided along with a momentary contact stop/reverse switch 36 having an associated stop button 39.

The start switch 32 is a two section ganged switch with each section having four terminals 32a, 32b, 32c, 32d, or 32e, 32f, 32g, 32h. A mechanical linkage 34 is also provided to an additional switch section 33 having terminals 33a, 33b. A series circuit comprising the centrifugal switch 31, start winding 30b and capacitor 38, are connected across terminals 32b and 32f. The run winding 30a connects across the terminals 32a and 32e. Terminals 32a and 32c are short circuited as are 32e and 32g. Terminal 32b further connects with 32h and 32f connects with terminal 32d.

The stop/reverse switch 36 is a single section switch having four terminals 36a, 36b, 36c, 36d. A relay 43 having a relay coil 43a has one end connected to terminal 36b and the other to 32e of the start motor switch. Terminal 36d connects with terminal 32a of the start motor switch. Terminal 36a connects through a normally closed reverse switch 40 which opens when the machine rotates for a predetermined portion of a revolution or predetermined time. A mechanical linkage connected to the motor shaft or cutters of the shredding machine mechanically opens the reverse switch during reverse operation.

The switching portion 35 of relay 43 includes first switch section 35a, 35b and second switch section 35c, 35d, the two switch sections being ganged together.

One side of the AC input line 37a connects to switch terminals 35a, 35c, 33a, and 36c. The other side of the AC line 37b connects to one side of the relay coil 34 and switch terminals 32e, 32g.

The system illustrated in FIG. 1 operates as follows. When AC power is applied at 37a, 37b, no power is applied to the shredder motor 30 since switch section 35a, 35b and switch section 35c, 35d are both normally open. When the start motor switch 32 is depressed into its downward momentary contact position, switch section which is normally open, closes thus latching on the relay 43 through the switch section 36a, 36b. This causes switch sections 35a, 35b, and 35c, 35d to latch into a closed position. Power is thus applied to the run winding 30a. The start winding 30b receives power through switch sections 32c, 32d and 32g, 32h (the momentary contact position) for forward operation of the motor. As soon as the motor reaches a predetermined speed, centrifugal switch 31, which is normally closed, opens and the motor continues running in the forward direction. As the start motor switch 32 is released, the motor continues to run in the forward position. If jamming of the paper shredding mechanism 28 occurs, the centrifugal switch 31 will close as the motor speed falls below a predetermined point and power will again be applied to the start winding but in a phase opposite that originally applied relative to the run winding as a result of the reverse wiring at switch 32. As the motor runs in the reverse position, the centrifugal switch will again open and the motor will continue to operate in reverse. After a predetermined time period, or after a predetermined portion of a revolution, the reverse switch 40 is mechanically actuated, such as by an arm connected to the cutter mechanisms of the paper shredder, so as to open the normally closed reverse switch 40. When switch 40 opens, the relay 33 unlatches and the motor stops. If further reverse operation is desired, the stop/reverse button 39 can be depressed. As long as the momentary contact switch 36 is held in the down position, the motor will continue to run in reverse.

During normal operation of the system when jamming does not occur, to stop the forward operation of the motor, the stop/reverse switch 36 is activated which unlatches relay 33. Again, if desired, reverse operation can be performed by holding the stop switch 36 in a depressed condition.

An alternate embodiment of the automatic reversing system of the invention for shredding machines or the like is generally illustrated at 10 in FIG. 2. A paper shredding mechanism 11 is driven by the shredder motor 13 via a mechanical drive unit 12. The shredder motor 13 has a run winding 14, a phase changing capacitor 9, and a start winding 15. A centrifugal switch S4 is also provided which is closed when the motor is rotating below a certain speed and which opens as the motor shaft rotates at a speed greater than a predetermined speed.

A switch unit 16 connects the motor windings of the motor 13 with an AC power source at input terminals 20a, 20b. The switch unit 16 has a manually actuatable push button 17 mechanically linked to a two position push actuation type switch S1. A momentary contact gang switch 18 is provided comprised of first and second switch gangs S2, S3, each having four terminals. A mechanical linkage 19 links the switch gangs S2 and S3 with the two position switch S1.

AC power source terminal 20a connects with terminal a2 of switch S1. The remaining terminal b2 of switch S1 connects to one end of the run winding 14. The other end of run winding 14 connects to the other AC input terminal 20b.

One end of the start winding 15 connects through centrifugal switch S4 to terminals b1 and b2 of gang S2 of switch 18. The other end of start winding 15 connects through a phase change capacitor 9 to terminals b1 and b2 of gang S3 of switch 18. Terminal a1 of gang S2 connects to AC input terminal 20b and terminal a2 of gang S2 connects both to terminal b2 of switch S1 and to terminal a1 of gang S3. Terminal a2 of switch S3 connects to AC input terminal 20b.

Operation of the alternate embodiment of the automatic reversing system of the invention will now be described. To initiate forward operation of the shredder motor, switch S1 is pushed to position a2, b2. Since switch gangs S2 and S3 are mechanically coupled to switch S1 at this time, momentary contact occurs between terminals a2, b2 of switch S2 and a1, b2 of switch gang S3. Since the motor has not yet begun to rotate, centrifugal switch S4 is closed. Because of the phase change occurring by virtue of capacitor 9, the phase of current in coil 15 relative to current 14 differs so as to create in known manner a starting torque in the forward direction. When the motor rotor reaches a predetermined speed, centrifugal switch S4 opens. The centrifugal switch is designed such that it will open quite rapidly, typically in a time period shorter than the momentary contact which is occurring in switch gangs S2 and S3.

After the centrifugal switch S4 opens, switch gangs S2 and S3 return to their initial positions a1, b1. In the initial positions of these switch gangs, the start winding 15 is connected in reverse fashion to the AC input relative to the connection of the run winding. Consequently, the initial position constitutes a reverse mode of operation for the start winding 15 since the phase of the current is inverted relative to the current and coil 14. However, since the centrifugal switch S4 is opened, power is not fed into the start winding 15 at this time.

If jamming of the machine occurs, centrifugal switch S4 will close and the motor will reverse. As centrifugal switch S4 again opens, the motor continues to run in reverse until the push button 17 is again actuated to return switch S1 to its initial position a1, b1 and shut power to the machine off. As this occurs, of course, the mechanical linkage between S1 and switch S2 and S3 is reestablished. The machine is now ready for a new operation cycle.

The switch unit 16 of FIG. 2 functions such that gangs S2 and S3 are mechanically coupled in a manner well known in the art to S1 during initial actuation but are then released permitting the momentary contact switch gangs S2 and S3 to return to their original positions. As S1 is actuated for a second time, it returns to its original position and a mechanical linkage well known in the art is recoupled between S1 and the switch gangs S2 and S3.

With the invention, when the paper shredder jams, it immediately reverses and the jammed paper is thrust outwardly such that the machine automatically clears itself. The system of this invention may also be adaptable to systems wherein expulsion of a jamming material will not result in further jamming.

Although various minor modifications may be suggested by those versed in the art, it should be understood that I wish to embody within the scope of the patent granted hereon, all such modifications as reasonably and properly come within the scope of my contribution to the art.

I claim as my invention

1. An automatic reverse shredder system, comprising:
  a shredder having an AC drive motor with a run winding, a starter winding assembly, and centrifugal switch means for disconnecting power feed to the starter winding assembly when the motor is rotating above a predetermined speed;
  an AC power source;
  manually actuatable switch circuit means connected between said AC power source and motor windings, said switch circuit means together with said centrifugal switch means turning on the shredder motor for normal forward operation when manually actuated, and automatically reversing the motor when jamming of the shredder occurs and the motor falls below a predetermined speed; and
  said manually actuatable switch circuit means including a momentary contact start switch, a momentary contact stop switch, reverse switch means for stopping reverse rotation of the motor after a predetermined reverse operation of the shredder, and a latch means, said latch means being directly latched when the start switch is actuated and being unlatched when either the stop switch or the reverse switch means is actuated.

2. An automatic reverse shredder system, comprising:
  a shredder having an AC drive motor with a run winding, a starter winding assembly, and centrifugal switch means for disconnecting power feed to the starter winding assembly when the motor is rotating above a predetermined speed;
  an AC power source;

a circuit means including a momentary contact start switch for starting operation of the motor and for reversing connections of the starter winding assembly to the AC power source relative to a connection of the run winding to the AC power source; and momentary contact stop/reverse switch means for stopping the motor and for reversing the motor, said stop/reverse switch means stopping the motor during forward rotation and operating the motor in a reverse direction after the motor is stopped as long as the stop/reverse switch means is held in its momentary contact position.

3. An automatic reversing system for a motor, comprising:

an AC drive motor with a run winding, start winding assembly, and a centrifugal switch means for disconnecting power feed to the start winding assembly when the motor is rotating above a predetermined speed;

an AC power source;

manually actuatable switch circuit means connected between the AC power source and motor windings, said switch circuit means together with said centrifugal switch means turning on the motor for normal forward operation when manually actuated and automatically reversing the motor when rotation of the motor is prevented while power is still applied and the motor rotor falls below a predetermined speed; and the switch circuit means including a momentary contact start switch and a latching means which assumes a latched mode in direct response to closure of the momentary contact start switch.

4. The system of claim 3 wherein the latching means is connected to be unlatched by activation of a stop switch.

5. The system of claim 3 wherein the manually actuatable switch circuit means includes a momentary contact switch having two normally closed switch and one normally open switch section, and further including a latching switch having two switch sections, a stop switch connected to unlatch the latching switch, and a reverse switch means connected for ceasing operation of the machine in the reverse direction after a predetermined rotational period.

6. The system of claim 3 wherein the centrifugal switch means has two terminals and is connected at one end of the start winding, a capacitor being connected also in series with the start winding.

7. An automatic reverse shredder system, comprising:

a drive motor with a run winding, start winding, and centrifugal switch means for disconnecting power feed to the start winding assembly when the motor is rotating above a predetermined speed;

switch circuit means connected to the start winding for reversing a phase of AC power fed from an AC power source to the start winding relative to the run winding;

latching circuit means which assumes a latched mode when power is applied thereto by closing a momentary contact start switch and which unlatches when either a stop switch is activated or a reverse switch means which senses a predetermined reverse rotation of the motor is activated.

8. An automatic reverse shredder system, comprising:

a shredder having an AC drive motor with a run winding, a starter winding assembly, and centrifugal switch means for disconnecting power feed to the starter winding assembly when the motor is rotating above a predetermined speed;

an AC power source;

a manually actuatable on-off switch connected to the AC power source;

a momentary contact switch circuit means directly actuatable by the on-off switch for reversing connections of the starter winding assembly to the AC power source relative to a connection of the run winding to the AC power source; and mechanical coupling means between the on-off switch and the switch circuit means such that for an initial manual actuating of the on-off switch, the switch circuit means temporarily assumes its momentary contact position and then automatically reassumes its rest position, and upon a second manual actuation of the on-off switch a mechanical coupling between the on-off switch and switch circuit means is reset.

9. An automatic reverse shredder system, comprising:

a shredder having an AC drive motor with a run winding and a starter winding having a capacitor and centrifugal switch connected in series therewith;

first and second AC power source terminals;

a first two position switch connected in series with the first AC input terminal;

the run winding having one end connected to the second AC input terminal and the other end connected to the two position switch;

a momentary contact switch having first and second gangs, the gags being wired such that in a rest position the switch the start winding is connected to the second terminal of the AC input line and the two position switch for reverse direction operation, and in the momentary position the start winding is connected for forward operation of the motor; and mechanical linkage means between the two position switch and momentary contact switch such that when the two position switch is actuated, the momentary contact switch makes momentary contact.

10. The system of claim 9 wherein the two position switch comprises a push buttom switch which assumes an "on" position when the push buttom is pushed a first time and which assumes an "off " position when the push button is pushed a second time, the first and second gangs of the momentary switch being mechanically coupled to the push button of the two position switch.

* * * * *